US006441866B1

United States Patent
Chen et al.

(10) Patent No.: US 6,441,866 B1
(45) Date of Patent: Aug. 27, 2002

(54) EDGE ENHANCEMENT WITH BACKGROUND NOISE SUPPRESSION IN VIDEO IMAGE PROCESSING

(75) Inventors: Datong Chen, Fremont; Hongli Yang, Sunnyvale, both of CA (US)

(73) Assignee: OmniVision Technologies, Inc., Sunnyvale, CA (US)

( * ) Notice: Subject to any disclaimer, the term of this patent is extended or adjusted under 35 U.S.C. 154(b) by 0 days.

(21) Appl. No.: 09/231,932

(22) Filed: Jan. 14, 1999

(51) Int. Cl.[7] .................................................. H04N 5/21
(52) U.S. Cl. ....................................... 348/606; 348/252
(58) Field of Search ................................ 348/623, 625, 348/627, 606, 252; 382/266–269, 275

(56) References Cited

U.S. PATENT DOCUMENTS

| | | | | |
|---|---|---|---|---|
| 4,091,414 A | * | 5/1978 | Chow | 358/174 |
| 4,408,233 A | * | 10/1983 | Nahon et al. | 358/284 |
| 4,422,095 A | * | 12/1983 | Hosoya | 358/166 |
| 4,587,561 A | * | 5/1986 | Kudo | 358/167 |
| 4,853,783 A | * | 8/1989 | Ozaki | 358/162 |
| 5,369,446 A | * | 11/1994 | Parker et al. | 348/625 |
| 5,491,520 A | * | 2/1996 | Nozawa et al. | 348/625 |
| 5,912,715 A | * | 6/1999 | Hanai | 348/626 |
| 5,959,697 A | * | 9/1999 | Wu et al. | 348/624 |

OTHER PUBLICATIONS

Benson, Blair K. and Whitaker, Jerry C., "Broadcast Production Equipment, Systems, and Services—Color Cameras" and "Receivers—Video and Chroma Processing," *Television Engineering Handbook Featuring HDTV Systems*, Revised Edition, McGraw–Hill, 1992, pp. 14.92–14.93 and 13.154–13.157.

Makota Onga et al., "New Signal–Processing LSIs for the 8mm Camcorder," *IEEE Transactions on Consumer Electronics*, vol. 36, No. 3, Aug. 1990, pp. 494–501.

Yoshimochi, Shigeru et al, "A New Single Chip LSI for an NTSC CTV Signal Processing," *IEEE Transactions on Consumer Electronics*; vol. 35, No. 3, Aug. 1989, pp. 297–307.

\* cited by examiner

*Primary Examiner*—Victor R. Kostak
(74) *Attorney, Agent, or Firm*—Perkins Coie LLP

(57) ABSTRACT

In the field of imaging, various components may contribute to a loss in resolution at higher spatial frequencies, both horizontally and vertically. Higher spatial frequencies may occur at the edge of an image, where there may be a large transition in the signal output between adjacent pixels. To compensate, an edge enhancement method that produces overshoots in the transitions of the video image signal is used. One of the problems with the edge enhancement method is that the noise in the input signal may not be adequately suppressed. To suppress the background noise in the video image signal while still performing the desired edge enhancement function, biasing circuitry may be used to suppress the smaller transitions in the input signal. In particular, the biasing circuitry may be placed in the signal path between the output of a first delay line and the noninverting inputs of two of the signal amplifiers. In this manner, the smaller transitions in the signal which represent background noise may be suppressed, while the edges of the video image signal are still enhanced.

20 Claims, 4 Drawing Sheets

EDGE ENHANCEMENT WITH BACKGROUND NOISE SUPPRESSION IN VIDEO IMAGE PROCESSING

FIELD OF THE INVENTION

The present invention relates to signal processing for imaging arrays and, more particularly, to imaging edge enhancement with background noise suppression in a CMOS image sensor.

BACKGROUND OF THE INVENTION

Integrated circuit technology has revolutionized various fields including computers, control systems, telecommunications, and imaging. In the field of imaging, the charge couple device (CCD) sensor has made possible the manufacture of relatively low-cost and small hand-held video cameras. An alternative low-cost technology to CCD integrated circuits is the metal oxide semiconductor (MOS) integrated circuit. Using MOS technology, the signal processing circuitry can be integrated alongside the imaging circuitry, thus allowing for a single integrated chip to form a complete standalone imaging device. To reduce the costs of imaging systems, there has been increasing pressure to reduce the number of chips and other components while still maintaining high image quality.

An example of a single chip used for CTV image processing is detailed in "A New Single Chip LSI for an NTSC CTV Signal Processing," by Yoshimochi et al., *IEEE, Transactions on Consumer Electronics*, Volume 35, August 1989, p. 297. As described for the Yoshimochi et al. device, the video signal processing stage shown in FIG. 1 of that reference consists of an input clamp circuit (CLAMP), a black level stretcher (BLACK DET), a DC restoration circuit (DC RESTORATION), a switchable 3.58 MHz chroma trap (3.58 TRAP), a video delay line circuit to compensate the chroma signal delay time (DELAY LINE), a delay line type picture sharpness control (DL CONTOUR), a contrast control circuit (CONTRAST) and a brightness control circuit (CLAMP BRIGHT).

The delay line type picture sharpness control circuit (DL CONTOUR) of the Yoshimochi et al. device is shown in FIG. 4 of that reference, which has been reproduced as FIG. 1 herein. As illustrated in FIG. 1, the video input is received at a line A, which is coupled to the input of a delay line 10, and is also coupled to the inverting input of an amplifier 14. The output of delay line 10 is coupled to a line B, that is coupled to the input of a delay line 12, and is coupled to the non-inverting inputs of amplifiers 14 and 16 and is coupled to a summer 26. The output of delay line 12 is coupled to a line C, that is coupled to the inverting input of the amplifier 16. The output of the amplifier 14 is coupled to a line D that is coupled through a limiter 18 to a summer 22. The output of the amplifier 16 is coupled to a line E that is coupled through a limiter 20 to a summer 22. The output of summer 22 is coupled to the input of a sharpness control circuit 24. The output of sharpness control circuit 24 is coupled to a line F that is coupled to summer 26. The output of summer 26 is coupled to a line G, which provides the video output of the system. The Yoshimochi et al. reference states that this delay line type picture sharpness control circuit achieves a ringingless horizontal contour enhancement when compared with a conventional second order differential type.

The operation of the circuit of FIG. 1 is illustrated in the timing diagrams of FIGS. 2A–2G. FIGS. 2A, 2B, and 2C show the signals on the lines A, B, and C, respectively. As illustrated above, the signal on line B is produced by delaying the signal on line A for approximately one time period (t=approximately 160 ns) through the delay line 10. Then the signal on line C is produced by delaying the signal on line B for approximately one more time period through the delay line 12.

FIG. 2D illustrates the output D of amplifier 14 that subtracts the signal shown in FIG. 2A from the signal shown in FIG. 2B. FIG. 2E illustrates the output E of amplifier 16, which subtracts the signal shown in FIG. 2C from the signal shown in FIG. 2B. FIG. 2F shows the sum of the outputs D and E from the limiters 18 and 20, once they have been added through the summer 22, and then adjusted by the sharpness control 24 to become the signal F. FIG. 2G shows the output G of summer 26, which adds the signals shown in FIGS. 2B and 2F.

The overall purpose of the circuit of FIG. 1 and its operations illustrated in FIG. 2 can be described with reference to the timing diagrams of FIG. 3. In general, the purpose of the circuit of FIG. 1 is to enhance the transitions in the video signals that occur at the edge of an image. At the edge of an image, the signals produced by the pixels of the sensor array may have a sharp contrast from one pixel to the next, as the image is scanned out. In other words, at the edge of an image, one pixel may be receiving a signal at a low dark level, while the next pixel is receiving a signal at a high light level. FIG. 3A illustrates a transition at time $t_1$ representing a transition from a pixel receiving a low dark signal to a pixel receiving a high light signal. The signal shown in FIG. 3A is for an ideal case where the image processing circuitry reacts instantaneously. However, in actual signal processing circuitry, the various components may contribute to a loss in resolution at higher spatial frequency, such that the transition that is begun at time $t_1$ may not be completed until time $t_2$. A timing diagram illustrating this effect is shown in FIG. 3B. To compensate for this phenomena, one method is to enhance the edge of the image by adding an extra signal at the transitions to attempt to make the processed signal appear more like the signal shown in FIG. 3A. The signal that results from enhancing the edge of the signal is illustrated in FIG. 3C. It can be seen that the signal illustrated in FIG. 3C is comparable to the first half of the signal illustrated in FIG. 2G. Thus, the type of transition enhancement shown in FIG. 3C is what the circuit of FIG. 1 is attempting to produce.

One of the disadvantages of the circuit of FIG. 1 is that, in addition to producing symmetrical overshoots around transitions in the picture, it also amplifies the noise simultaneously. In other words, the same process that enhances the edges for desired signal transitions also enhances undesirable noise transitions.

The present invention is directed to a method and apparatus that overcomes the foregoing and other problems in the prior art. More specifically, the present invention is directed to a method and apparatus for imaging enhancement with background noise suppression.

SUMMARY OF THE INVENTION

A method and apparatus for image edge enhancement with background noise suppression is disclosed. By including biasing circuitry in the signal path, the symmetrical overshoots around transitions in the picture may be maintained, while at the same time smaller transitions in the signals such as those representing signal noise may be suppressed. In this manner, background noise is suppressed, while the edge of the image is enhanced. In particular, the biasing circuitry may be placed in the signal path between the output of the first delay line and the noninverting inputs of the two signal amplifiers.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 4:
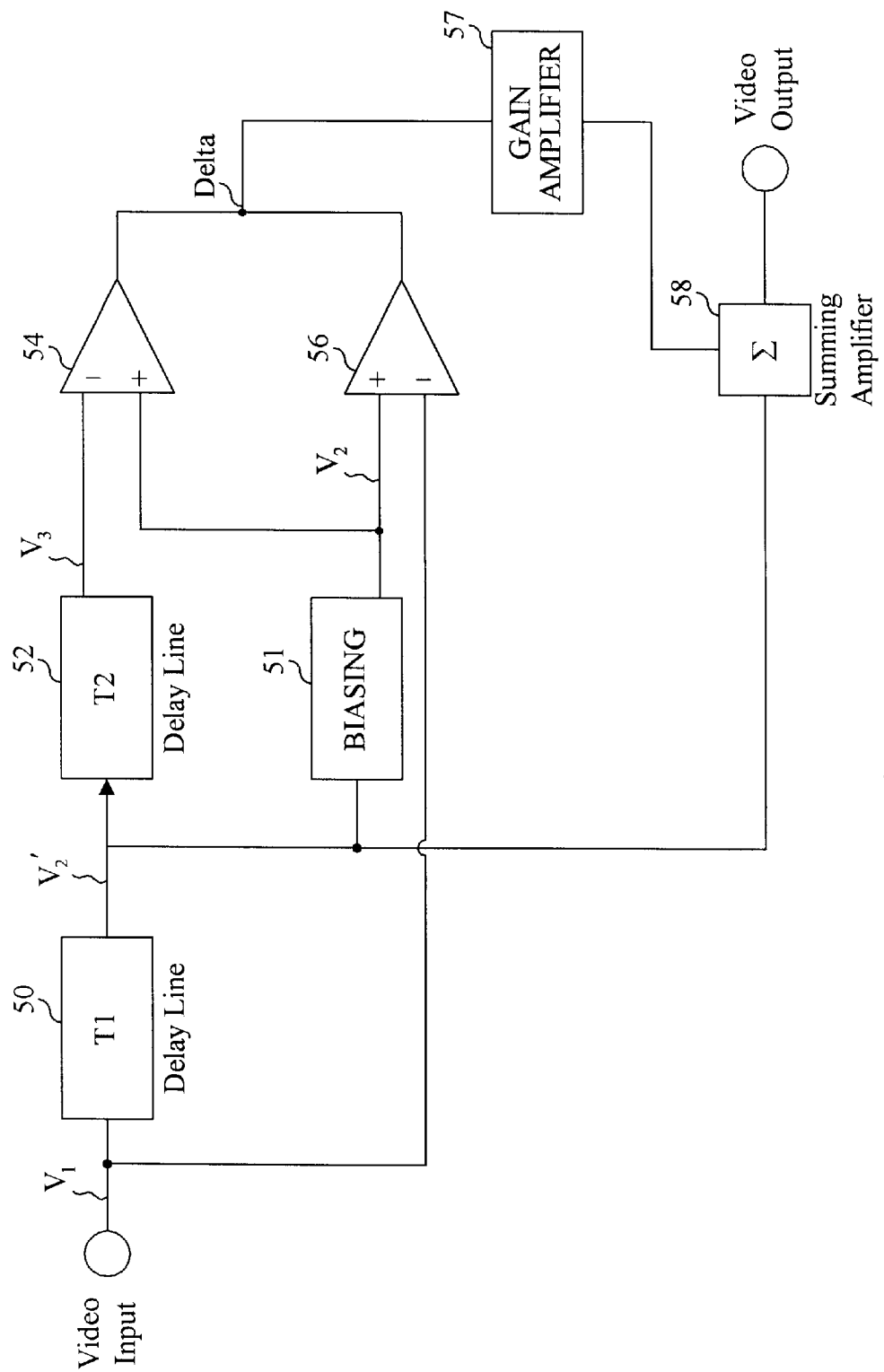
FIG. 4 is a schematic diagram of an edge enhancement circuit with background noise suppression formed in accordance with the present invention.

With reference to FIG. 4, an edge enhancement circuit with background noise suppression, formed in accordance with the present invention, is shown. As illustrated in FIG. 4, a video input is represented as a signal $V_1$ and is coupled to the input of a delay line 50 that is coupled to the inverting input of an amplifier 56. The output of the delay line 50 is represented as a signal $V_2'$ and is coupled to the input of the delay line 52, which is also coupled to the input of the biasing circuitry 51, and is also coupled to an input of a summing amplifier 58. The output of the delay line 52 is represented as a signal $V_3$ and is coupled to an inverting input of an amplifier 54. The output of biasing circuitry 51 is represented as a signal $V_2$ and is coupled to the noninverting inputs of amplifiers 54 and 56. The outputs of amplifiers 54 and 56 represent the signal DELTA and are coupled to the input of the gain amplifier 57. The output of the gain amplifier 57 is coupled to an input of the summing amplifier 58. The output of the summing amplifier 58 is the video output of the circuit.

Figure 2:
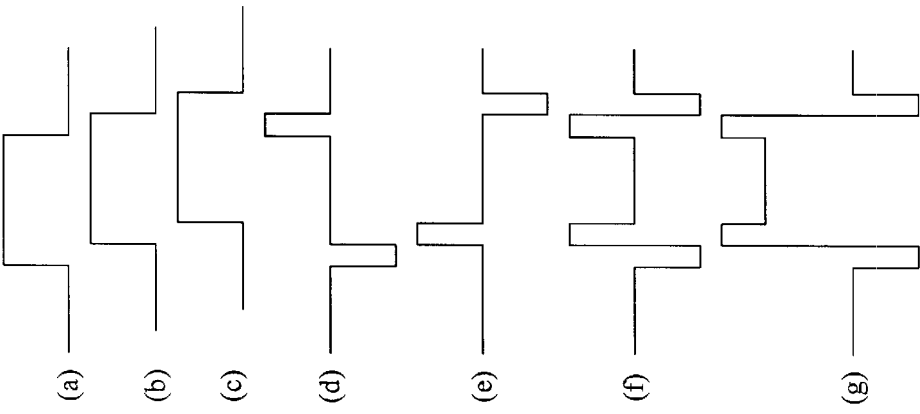
FIGS. 2A–2G are a set of timing diagrams illustrating the operation of the prior art circuit of FIG. 1.
Figure 1:
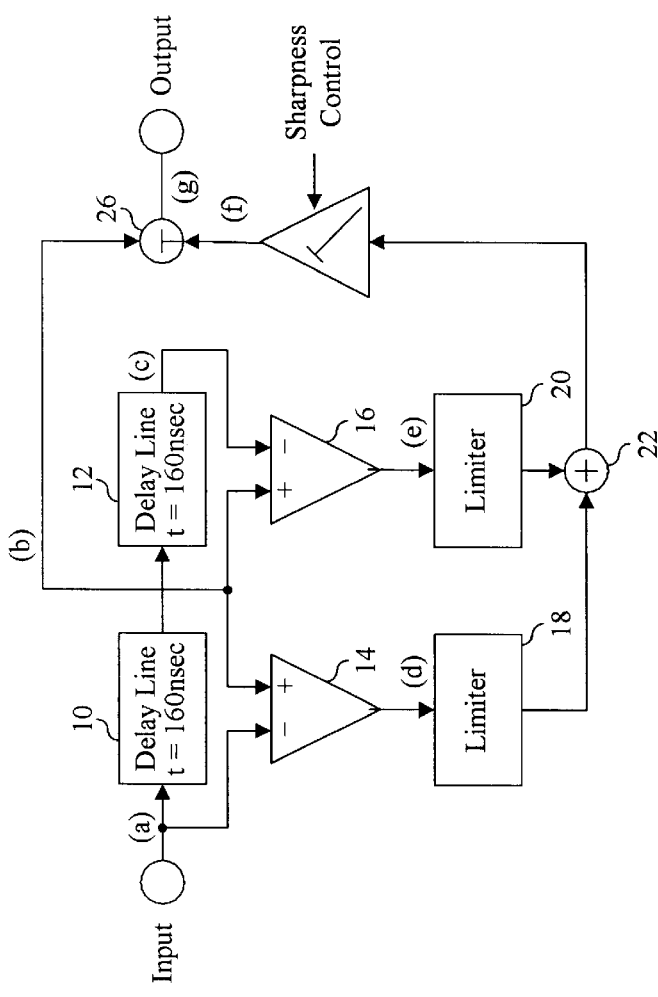
FIG. 1 is a schematic diagram of a prior art edge enhancement circuit.
Figure 3:
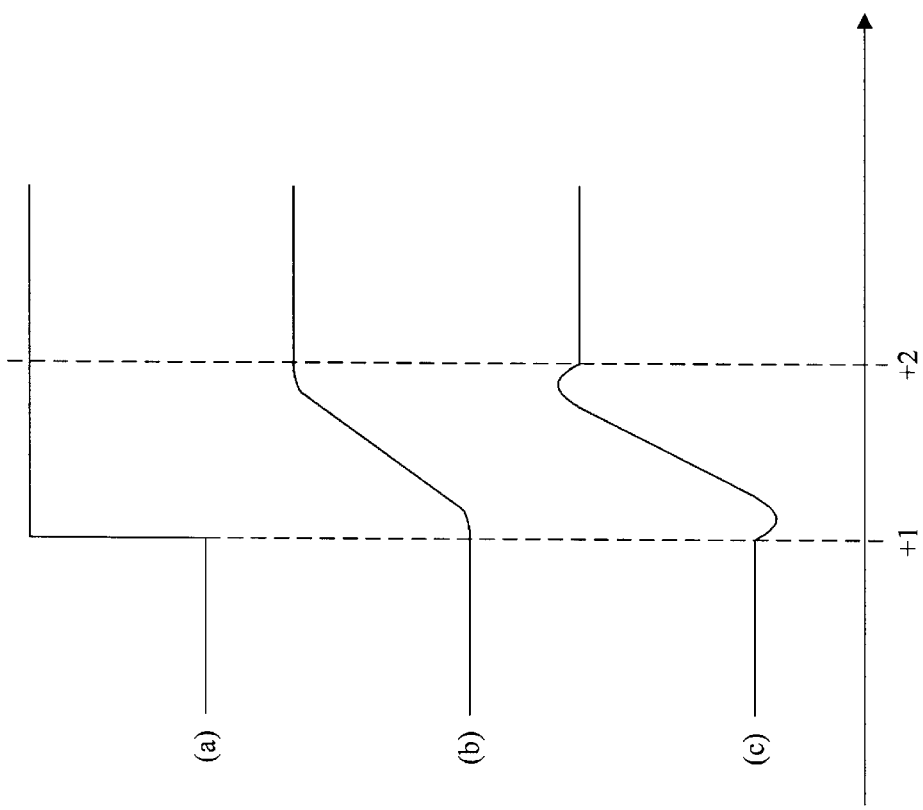
FIGS. 3A–3C are a set of timing diagrams illustrating the principle of operation of the prior art circuit of FIG. 1.

The edge enhancement operation of the circuit of FIG. 4 is similar to that of the prior art circuit of FIG. 1. Thus, the circuit of the present invention produces signals similar to those shown in the time diagrams of FIGS. 2A–2G and in FIGS. 3A–3C. In other words, similar to the circuit of FIG. 1, the circuit of FIG. 4 takes a video input signal such as that shown in FIG. 2A, which includes an upward and then a downward transition in the video input, representing edges in the video image, and produces symmetrical overshoots around transitions in the pictures such as those illustrated in FIG. 2G. As described earlier, these symmetrical overshoots represent the enhancement of the edges in the video image, as was previously described with reference to FIGS. 3A–3C.

One of the novel portions of the circuit of FIG. 4 is generally represented by the biasing circuitry 51. As described above, the biasing circuitry 51 is coupled between the output of the delay line 50 and the noninverting inputs of the amplifiers 54 and 56. The purpose of the biasing circuitry 51 is to suppress the background noise in the video input. As described above, one of the disadvantages of prior art circuits such as illustrated in FIG. 1 is that the noise is amplified simultaneously with the image signal.

Figure 5:
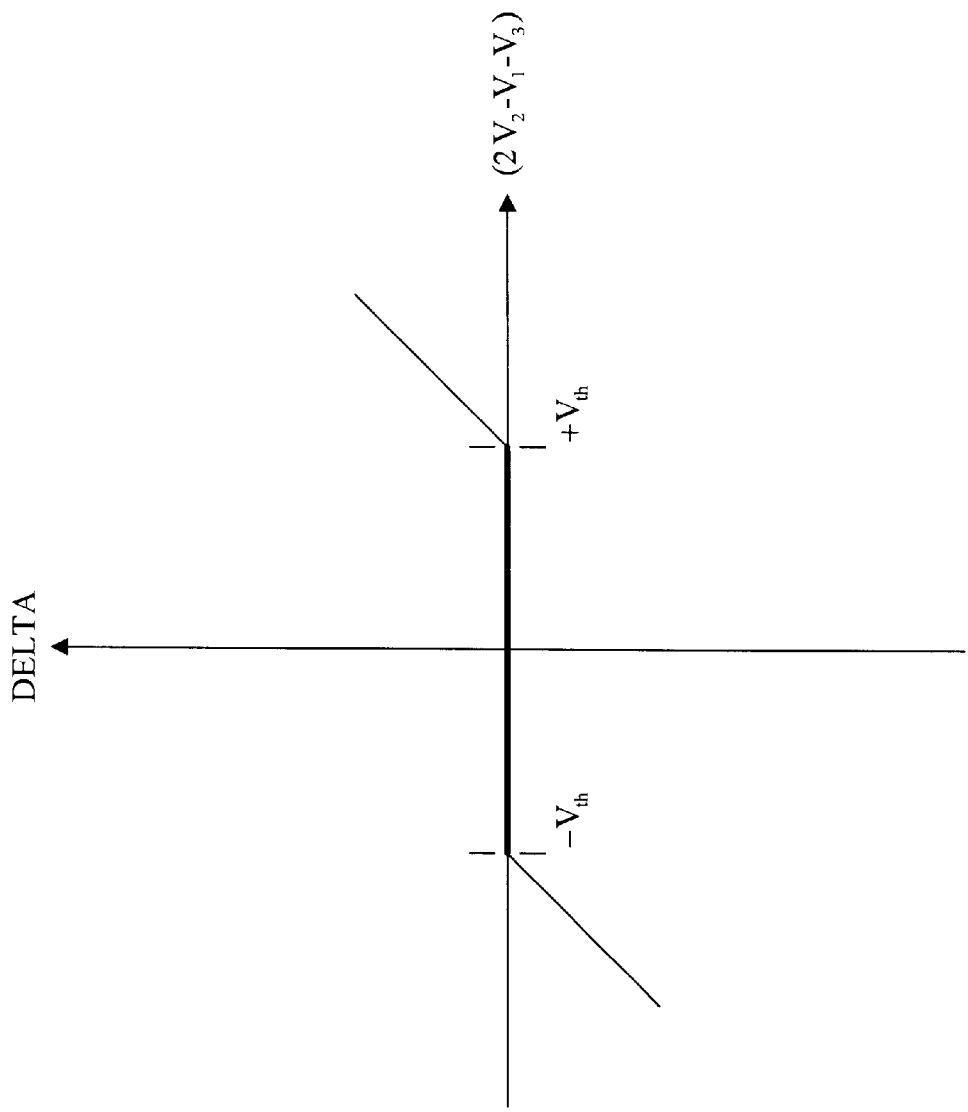
FIG. 5 is an input/output characteristic curve illustrating the operation of the circuit of FIG. 4.

The way in which the circuit of FIG. 4 suppresses background noise in the video input can be described with reference to FIG. 5. FIG. 5 illustrates an input/output characteristic curve for the circuit of FIG. 4. FIG. 5 illustrates how biasing circuitry 51 suppresses background noise from the video input signal by essentially removing lower amplitude transitions from the signal. An equation representing the input/output characteristic curve shown in FIG. 5 is as follows:

$$\text{DELTA} = \begin{cases} (2V_2 - V_1 - V_3) - V_{th} & \text{if } 2V_2 - V_1 - V_3 > V_{th} \\ (2V_2 - V_1 - V_3) + V_{th} & \text{if } 2V_2 - V_1 - V_3 < -V_{th} \\ 0 & \text{if } |2V_2 - V_1 - V_3| \le V_{th} \end{cases}$$

Thus, the biasing circuitry 51 causes the output DELTA from the amplifiers 54 and 56 to be equal to 0 if the magnitude of the combined inputs $(2V_2 - V_1 - V_3)$ is not greater than a threshold voltage $V_{th}$. Typically, background noise has a relatively low amplitude; thus, as long as the amplitude of the background noise is lower than the threshold voltage $V_{th}$, the background noise will be suppressed. The threshold voltage $V_{th}$ is thus selected so as to suppress a desired level of background noise, while still being low enough to allow passing of the image transitions in the video input signal. In this manner, the circuit of FIG. 4 is able to provide edge enhancement of the video input signal, while suppressing the background noise.

While the preferred embodiment of the invention has been illustrated and described, it will be appreciated that various changes can be made therein without departing from the spirit and scope of the invention. The present invention has been described in relation to a preferred embodiment. One of ordinary skill after reading the foregoing specification will be able to effect various changes, alterations, and substitutions of equivalents without departing from the broad concepts disclosed. It is therefore intended that the scope of the letters patent granted hereon be limited only by the definition contained in the appended claims and equivalents thereof, and not by limitations of the embodiments described thereof.

The embodiments of the invention in which an exclusive property or privilege is claimed are defined as follows:

1. In a video edge enhancement circuit comprising first and second delay lines coupled in series, the input signal to the edge enhancement circuit being delayed for a first time period by the first delay line to produce a primed first delayed signal, the primed first delayed signal being delayed for an additional time period by the second delay line to produce a second delayed signal, the edge enhancement circuit further comprising first and second amplifiers with inverting and noninverting inputs, the inverting input of the first amplifier receiving the input signal of the edge enhancement circuit, the inverting input of the second amplifier receiving the second delayed signal from the second delay line, the outputs of the first and second amplifiers being combined to produce a video output with edge enhancement of the transitions in the input signal;

the improvement comprising biasing circuitry coupled between the output of the first delay line and the noninverting inputs of the first and second amplifiers, the biasing circuitry producing a non-primed first delayed signal and acting to suppress background noise from the input signal by suppressing low amplitude transitions from the input signal.

2. The improvement claimed in claim 1, wherein the edge enhancement circuit further comprises a summing amplifier coupled between the output of the first delay line and the outputs of the first and second amplifiers.

3. The improvement claimed in claim 2, wherein the edge enhancement circuit further comprises a gain amplifier coupled between the outputs of the first and second amplifiers and the summing amplifier.

4. The improvement claimed in claim 1, wherein the biasing circuitry determines a threshold voltage, the biasing circuitry suppressing input signals that are lower in magnitude than the threshold voltage.

5. The improvement claimed in claim 4, wherein the combined output of the first and second amplifiers is near zero if the magnitude of twice the non-primed first delayed signal minus the input signal minus the second delayed signal is less than the threshold voltage.

6. The improvement claimed in claim 5, wherein if the magnitude of twice the non-primed first delayed signal minus the input signal minus the second delayed signal is greater than the threshold voltage, then the combined output of the first and second amplifiers is equal to twice the non-primed first delayed signal minus the input signal minus the second delayed signal.

7. An edge enhancement circuit for processing image signals, comprising:
(a) a first delay line for delaying an input signal for a first time period to produce a primed first delayed signal;
(b) a second delay line for delaying said first delayed signal for an additional time period to produce a second delayed signal; and
(c) processing circuitry for combining said input signal, said primed first delayed signal, and said second delayed signal to produce an output signal includes edge enhancement of edges in said input signal, said processing circuitry including biasing circuitry for producing a non-primed first delayed signal and for suppressing background noise from said input signal.

8. The edge enhancement circuit of claim 7, wherein the edge enhancement circuit is fabricated on a CMOS imaging chip along with image sensor circuitry.

9. The edge enhancement circuit of claim 7, further comprising first and second amplifiers, the inverting input of the first amplifier receiving the output of the second delay line and the inverting input of the second amplifier receiving the input signal, the biasing circuitry being coupled between the output of the first delay line and the noninverting inputs of the first and second amplifiers.

10. The edge enhancement circuit of claim 9, further comprising a summing amplifier coupled between the output of the first delay line and the outputs of the first and second amplifiers.

11. The edge enhancement circuit of claim 10, further comprising a gain amplifier coupled between the outputs of the first and second amplifiers and the summing amplifier.

12. The edge enhancement circuit of claim 7, wherein the biasing circuitry determines a threshold voltage, the biasing circuitry suppressing input signals that are lower in magnitude than the threshold voltage.

13. The edge enhancement circuit of claim 12, wherein the combined output of the first and second amplifiers is near zero if the magnitude of twice the non-primed first delayed signal minus the input signal minus the second delayed signal is less than the threshold voltage.

14. The edge enhancement circuit of claim 13, wherein if the magnitude of twice the non-primed first delayed signal minus the input signal minus the second delayed signal is greater than the threshold voltage, then the combined output of the first and second amplifiers is equal to twice the non-primed first delayed signal minus the input signal minus the second delayed signal.

15. A CMOS edge enhancement circuit for processing video image signals, comprising:
(a) a first delay line for receiving an input signal and producing a first delayed signal;
(b) a second delay line for receiving the first delayed signal and producing a second delayed signal;
(c) biasing circuitry for receiving the first delayed signal and producing a biased signal;
(d) a first amplifier with inverting and noninverting inputs, the inverting input receiving the second delayed signal and the noninverting input receiving the biased signal;
(e) a second amplifier with inverting and noninverting inputs, the inverting input receiving the input signal and the noninverting input receiving the biased signal;
(f) a gain amplifier for receiving the combined outputs of the first and second amplifiers and outputting an amplified combined signal; and
(g) a summing amplifier for receiving the first delayed signal and the output from the gain amplifier to produce the video output of the edge enhancement circuit.

16. The edge enhancement circuit of claim 15, wherein the biasing circuitry determines a threshold voltage, the biasing circuitry suppressing input signals that are lower in magnitude than the threshold voltage.

17. The edge enhancement circuit of claim 16, wherein the combined output of the first and second amplifiers is near zero if the magnitude of twice the biased signal minus the input signal minus the second delayed signal is less than or equal to the magnitude of the threshold voltage.

18. The edge enhancement circuit of claim 16, wherein if the magnitude of twice the biased signal minus the input signal minus the second delayed signal is greater than the magnitude of the threshold voltage, then the combined output of the first and second amplifiers is equal to twice the biased signal minus the input signal minus the second delayed signal.

19. A method of enhancing edges in a video image signal, comprising the steps of:
(a) delaying an input signal for a first time period to produce a first delayed signal;
(b) delaying said first delayed signal for an additional time period to produce a second delayed signal; and
(c) processing said input signal, first delayed signal, and second delayed signal to produce an output signal that includes enhancement of the edges in the input signal, said processing including a biasing stage in which lower amplitude transitions in the input signal are suppressed.

20. The method of claim 19, wherein the biasing stage processes the first delayed signal to produce a biased signal.

* * * * *

UNITED STATES PATENT AND TRADEMARK OFFICE
CERTIFICATE OF CORRECTION

PATENT NO.    : 6,441,866 B1
DATED         : August 27, 2002
INVENTOR(S)   : Chen et al.

It is certified that error appears in the above-identified patent and that said Letters Patent is hereby corrected as shown below:

Column 5,
Line 32, insert -- that -- between "signal" and "includes";

Signed and Sealed this

Eleventh Day of February, 2003

JAMES E. ROGAN
*Director of the United States Patent and Trademark Office*